Figure 1:
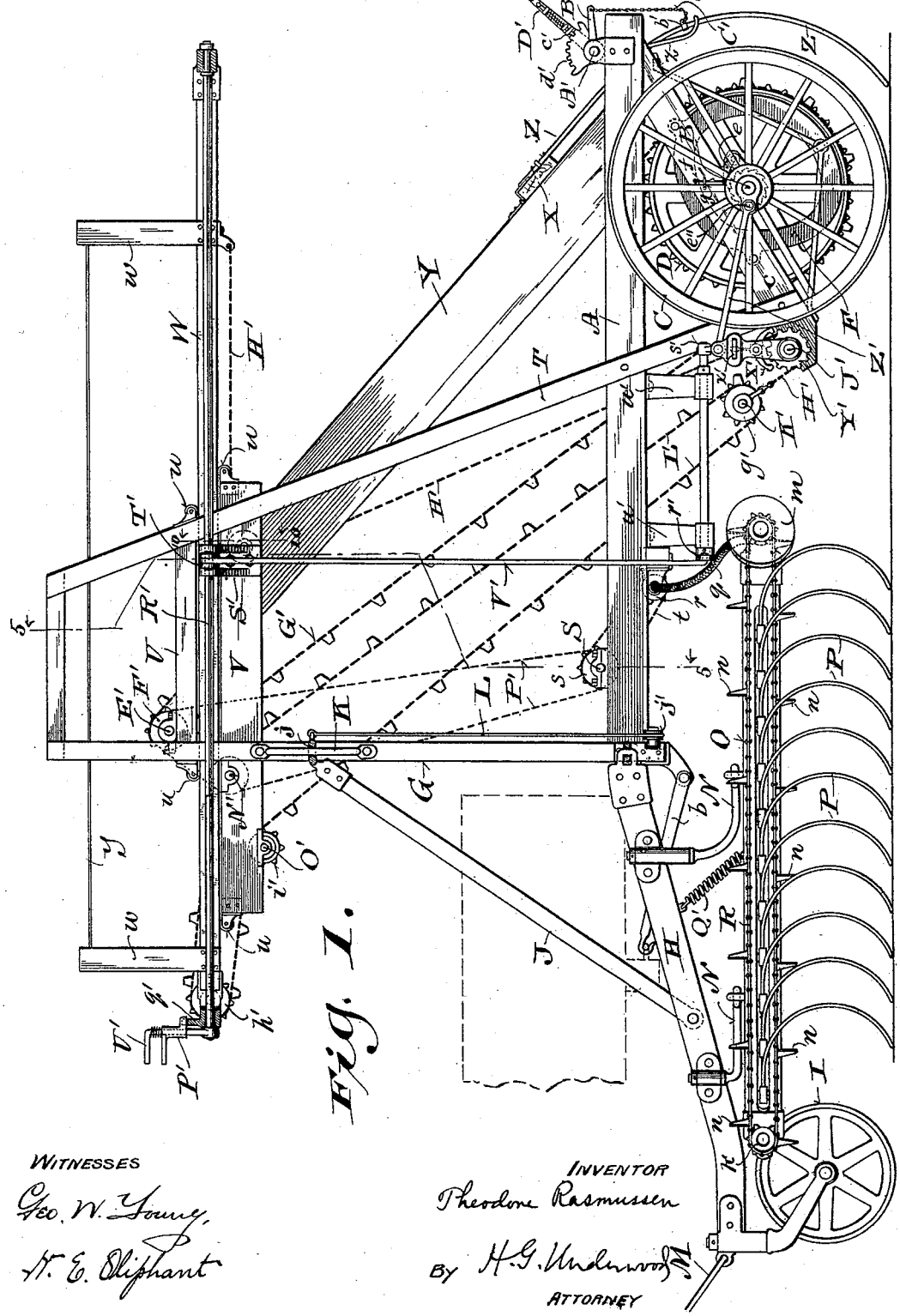

(No Model.) 4 Sheets—Sheet 1.
T. RASMUSSEN.
HAY RAKING AND LOADING MACHINE.

No. 582,951. Patented May 18, 1897.

WITNESSES
Geo. W. Young,
N. E. Oliphant

INVENTOR
Theodore Rasmussen
By H. G. Underwood
ATTORNEY

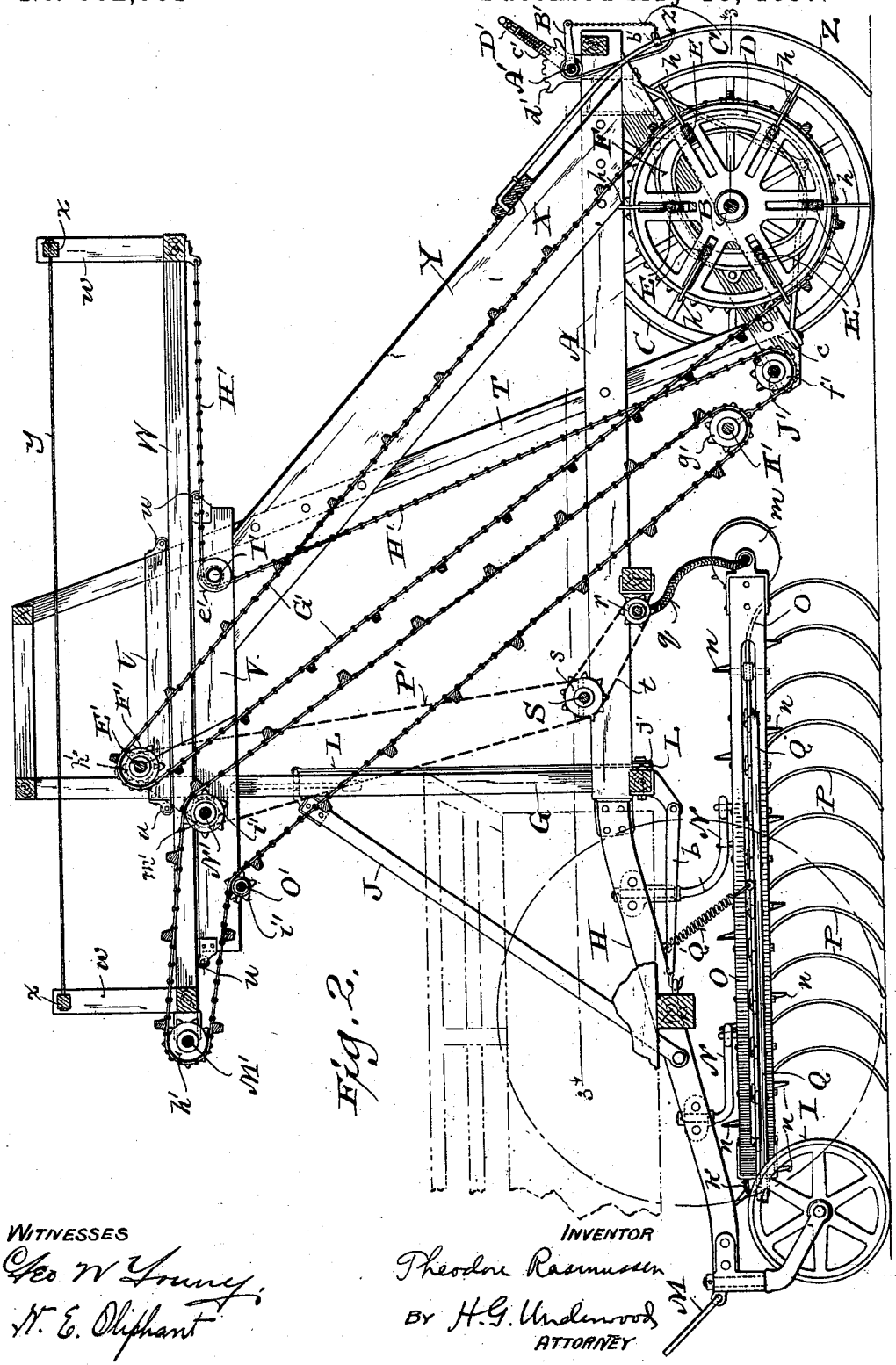

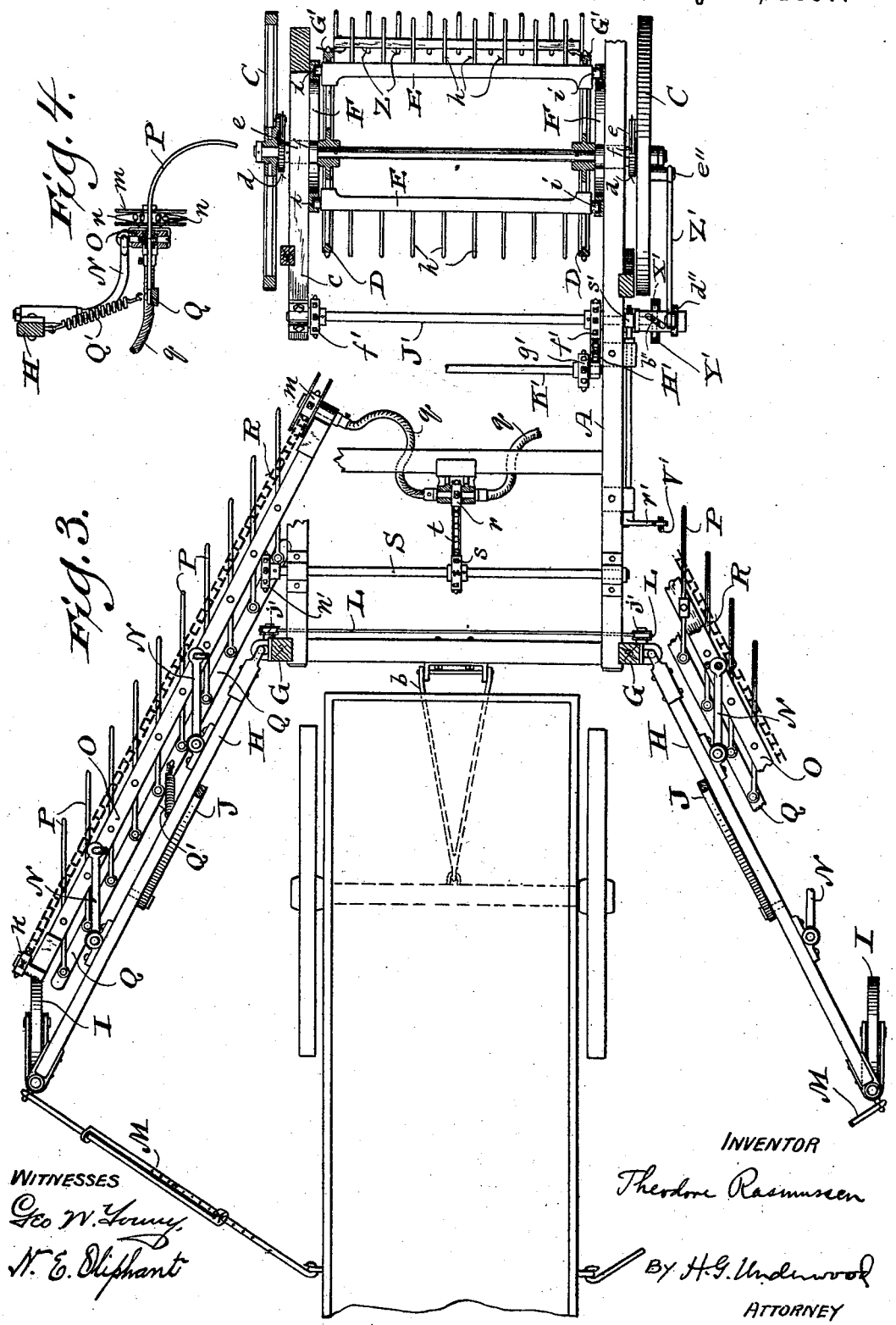

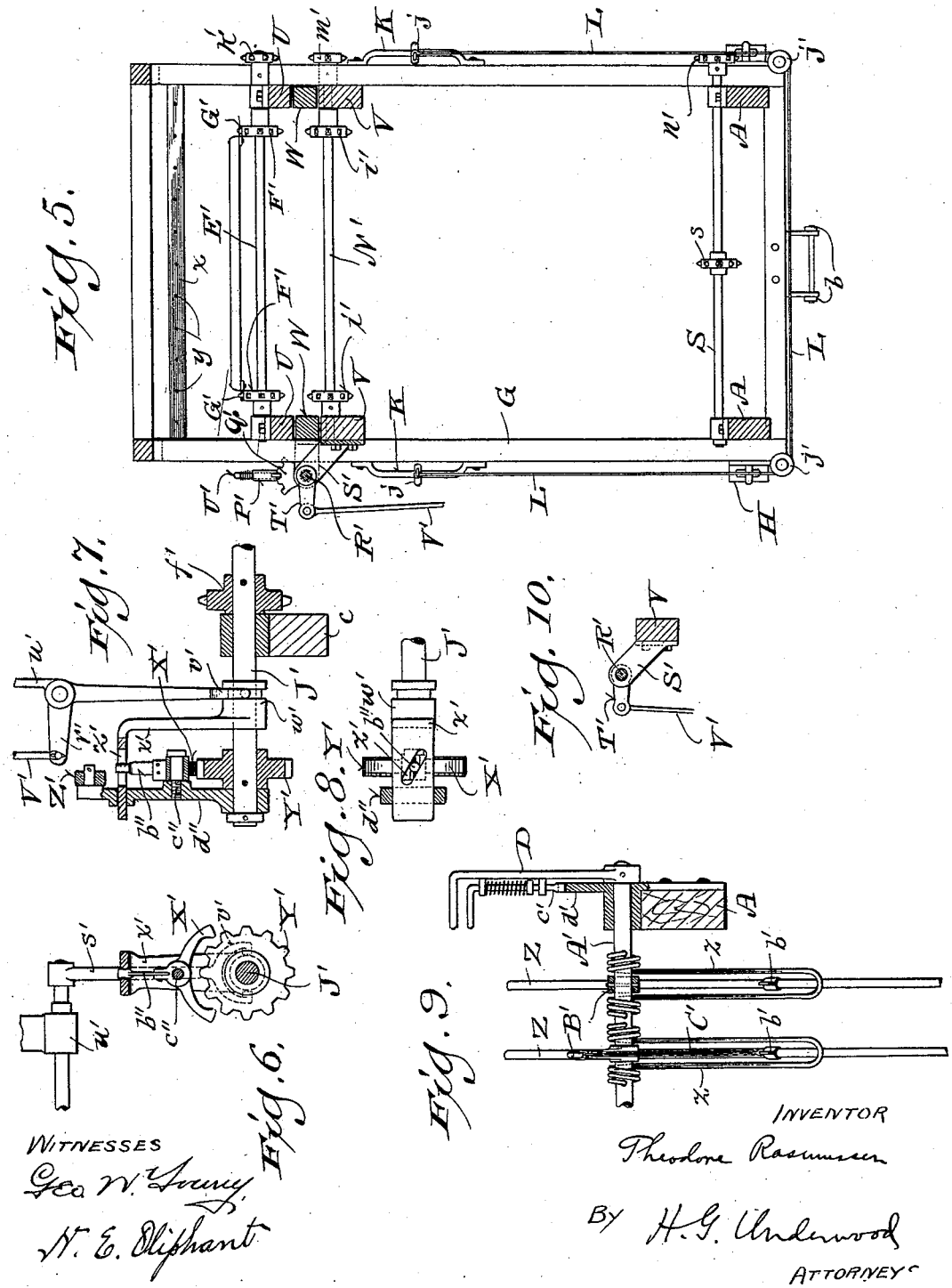

UNITED STATES PATENT OFFICE.

THEODORE RASMUSSEN, OF UNION GROVE, WISCONSIN, ASSIGNOR OF ONE-HALF TO CLIFFORD R. GOLDSWORTHY, OF SAME PLACE.

HAY RAKING AND LOADING MACHINE.

SPECIFICATION forming part of Letters Patent No. 582,951, dated May 18, 1897.

Application filed March 7, 1896. Serial No. 582,189. (No model.)

*To all whom it may concern:*

Be it known that I, THEODORE RASMUSSEN, a citizen of the United States, and a resident of Union Grove, in the county of Racine and State of Wisconsin, have invented certain new and useful Improvements in Hay Raking and Loading Machines; and I do hereby declare that the following is a full, clear, and exact description thereof.

My invention has for its object to provide a simple, economical, and efficient machine that will operate in conjunction with a suitable vehicle to rake and load hay.

It therefore consists in certain peculiarities of construction and combination of parts hereinafter set forth with reference to the accompanying drawings and subsequently claimed.

In the drawings, Figure 1 represents a side elevation of my hay raking and loading machine; Fig. 2, a vertical longitudinal section of the same; Fig. 3, a plan view of the machine, partly broken away and in horizontal section, on line 3 3 of Fig. 2; Fig. 4, a detail view illustrating a transverse section of a front rake mechanism constituting part of the machine; Fig. 5, a vertical transverse section on the plane indicated by line 5 5 in Fig. 1; Figs. 6, 7, and 8, detail views illustrating a pallet-and-ratchet mechanism constituting part of said machine; Fig. 9, a detail view illustrating part of a rear rake, and Fig. 10 a detail section taken on line 10 10 of Fig. 1.

Referring by letter to the drawings, A represents a horizontal frame, and shackeled to the front cross-timber of this frame is a tongue $b$ for connection with the rear axle of a running-gear carrying a suitable body or rack on which to load hay. The rear of the frame has depending trussed timbers $c$, set at an angle and mounted on an axle B for traction-wheels C, the latter being of any suitable construction. The frame, axle, and wheels constitute the truck portion of my machine. The axle is free to rotate and is provided with ratchet-wheels $d$ for the engagement of detents $e$, in pivotal connection with the wheels C, the latter being free to turn independent of said axle when the detents are disengaged from the ratchet-wheels. Connected to the detents are lift-rods $f$, that work in guides $g$ and have latch-lugs that rest upon the guides to hold said detents out of engagement with the ratchet-wheels $d$, fast on the aforesaid axle.

Fast on the axle B are radially-slotted sprocket-disks D, and bars E, provided at intervals of their length with outwardly-projecting fingers $h$, are loosely arranged in the disk-slots, the ends of these bars being provided with antifriction-rollers $i$, that travel in cam-tracks F, made fast to the depending timbers $c$ of frame A, the contour of the tracks being such that said bars are caused to reciprocate in the slotted disks at predetermined intervals for the purpose hereinafter specified.

In hinge connection with posts G, rising from the front of truck-frame A, are bars H, and in swivel connection with the forward ends of these bars are wheels I, that run on lines parallel to the rear truck-wheels C, above specified. Pivoted to the bars H are braces J, having their upper ends provided with horizontal eyes $j$ in loose engagement with vertical brackets K on the posts G, and a cable L, run under rearwardly-extended pulleys $j'$ at the lower ends of posts G, has its ends connected to said eyes.

By means of the construction and arrangement of parts specified in the foregoing paragraph it will be seen that provision is made for a play by which the machine may automatically accommodate itself to uneven ground. Reaches M are employed to connect the hay-receiving vehicle with the forward ends of bars H, and thus the latter are held at angles to the line of draft. As herein shown, the reaches are preferably paired, those in each pair being adjustable one upon the other, in order that the angle of each bar to line of draft may be varied at will. Cranks N in bearings on the bars H have eye connection with longitudinally-slotted bars O, and pivoted in these latter bars are rake-teeth P, likewise connected at their upper ends to eveners Q, these eveners being joined to spiral springs Q', suspended from the former bars, a construction and arrangement of parts that is best illustrated in Figs. 3 and 4.

It is preferable to provide the extremities of each bar H with sprocket-wheels $k$ $m$ for the link belt R, the latter having fingers $n$, that operate to clear hay from the rake-teeth and force it back in the path of the fingers $h$ above specified, it being understood that the travel of the belt is transverse to said rake-teeth. The sprocket-wheels $m$ at the rear of bars H are flanged on both sides to thereby insure a shedding of hay from the link belts R, traveled over said wheels, and the spindles $p$ of these wheels are connected by flexible shafts $q$ with journals of another sprocket-wheel $r$, mounted in the frame A, the latter sprocket-wheel and one, $s$, on a shaft S being connected by a link belt $t$, as best illustrated in Fig. 3.

Suitable braces connect the upper ends of posts G with corresponding ends of inclined supports T, fast to frame A, said posts and supports being also connected by guide-bars U V, arranged above and below sides of a movable frame W, it being preferable to provide the guide-bars with antifriction-rollers $u$ in opposition to edges of the latter frame.

Posts $w$ at ends of frame W are connected by braces $x$, and these braces support a series of wires $y$, that prevent hay lifted above said frame from being scattered by wind.

A bar X, hinged to wind-boards Y, connecting the frame A and supports T, constitutes a support for rear rake-teeth Z, the latter being held down to their work by spring-yokes $z$, depending from a shaft A', that has its bearing on the aforesaid frame. Crank-arms B' on shaft A' are connected by chains C' with clips $b'$ on the rear rake-teeth Z, and a lever D' on said shaft is provided with a spring-controlled latch $c'$, engageable with a rack $d'$. Therefore it will be understood that the tension of the spring-yokes may be varied. It also follows that said rake-teeth may be swung up by an adjustment of lever D' to bring them some distance from the ground.

A shaft E', mounted on the upper guide-bars U, is provided with sprocket-wheels F' for a chain conveyer G', that also runs on the sprocket-disks D, above specified, the lifting stretch of this conveyer being intermediate of the aforesaid wind-boards, whereby scattering of hay is prevented.

Chains H', connected to the rear of frame W, are run over sprocket-wheels $e'$ on studs I', supported by guide-bars V, and then down under other sprocket-wheels $f'$ on a shaft J', that is mounted on the depending timbers $c$ of frame A, the lower ends of said chains being connected to a spindle K', that has no bearings. Loose on the spindle K' are sprocket-wheels $g'$ for another chain conveyer L', that also travels on other sprocket-wheels $h'$, fast to a shaft M', mounted in the forward portion of frame W; and still other sprocket-wheels $i'$ are arranged on shafts N' O' to support said conveyer, these latter shafts being supported by the guide-bars V aforesaid.

Sprocket-wheels $k'$ $m'$ on shafts E' N' are connected by a link belt P' with another sprocket-wheel $n'$ on shaft S, and thus power is transmitted to the flexible shafts $q$, above specified.

A squared rod R', journaled on frame W, engages corresponding openings in parallel jaws of a bracket S', fast to a guide-bar V for said frame, and a lever-arm T', having a squared opening engaged by the rod, is arranged intermediate of the bracket-jaws. The rod R' is controlled by a crank U', having a spring-controlled latch P', engageable with a rack $q'$, in order to hold said rod in rotarily-adjusted position. In pivotal connection with lever-arm T' is a link V', that connects with an arm of a bell-crank $r'$, supported in hangers $u'$ on the frame A, the other arm $s'$ of this bell-crank being terminated in a yoke $v'$, the extremities of which engage an annular groove in a hub $w'$, loose on the shaft J', above specified. A right-angled arm $x'$, rising from hub $w'$, has an oblique slot $z'$ in a horizontal portion thereof, and engaging this slot is a spring-shank $b''$, pertaining to a pallet X', co-operative with a toothed wheel Y' on shaft J', this pallet being supported on a stud $c''$, extending from an arm $d''$, loose on said shaft. The arm $d''$ has a slot engaged by the horizontal portion of angle-arm $x'$, and a pitman Z' connects the former arm with a crank $e''$ on axle B of the machine.

The pallet X' being engaged with the wheel Y', (incidental to movement of rod R' in either direction from central position,) oscillation of arm $d''$ by the pitman Z' will cause intermittent rotation of shaft J' for the purpose of operating chains H' and thereby moving frame W forward or back, according to which arm of said pallet is engaged with said wheel. When this operation is effected, the conveyer L' is obviously free to conform to movement of frame W, owing to the connection of the suspended spindle K' with the chains H', and longitudinal movement of said frame ceases the instant rod R' and pallet X' are centered, or, in other words, brought to normal position.

The pallet X' has the spring-shank $b''$ in order that it may at all times be brought into engagement with toothed wheel Y', even though it should first strike on a tooth of the same. The spring-shank of said pallet also permits of the latter slipping the teeth of wheel Y' when on other than working throw after engagement of said pallet and wheel has been effected. In practice the hay from the front or gathering rakes is picked up by the fingers $h$ of the bars E, that are reciprocative in the radially-slotted sprocket-disks D, and lifted onto the conveyer G', the cam-tracks F being timed to cause retraction of said bars as soon as said hay is fairly started on said conveyer, whereby said fingers automatically clear the aforesaid hay. The rear rake-teeth Z insure all the hay being caught on conveyer G', and this hay is shed from said conveyer onto the one L', from whence it falls into the vehicle to which my machine is coupled. It also follows that by automatic intermittent adjustment of frame W forward and back the hay may be evenly distributed in the vehicle. It may be found practical to omit the finger-bar mechanism and depend on the elevating-conveyer to pick up the raked hay.

The front rakes are held to their work by resistance of the springs Q' to upward tilt of said rakes, and the latter are readily swung in line parallel with the truck portion of the machine when the latter is on the road or when it is necessary to clear gateways, said rakes being held in this position by crossing the adjustable reaches or stay-rods and connecting them to opposite rakes, it being understood that the term "front" or "gathering" rakes is applied to the mechanisms adjustable to various angles and embracing the rake-teeth P in pivotal connection with supporting-bars and eveners. When it is not desirable to operate the machine and yet convey it from place to place, the detents $e$ are disengaged from the ratchet-wheels $d$ in order that the wheels C may rotate without transmitting motion to the axle B of said machine.

Having now fully described my invention, what I claim as new, and desire to secure by Letters Patent, is—

1. A hay rake and loader comprising a truck for connection with a vehicle to be loaded, gathering-rakes and means for holding the same at angles to the line of draft in opposite directions from the truck, an elevating-conveyer for raked hay, a delivery-conveyer arranged to receive hay from the elevating-conveyer, and suitable mechanism operative to accomplish longitudinal horizontal adjustment of the delivery-conveyer independent of said elevating-conveyer.

2. A hay rake and loader comprising a truck for connection with a vehicle to be loaded, gathering-rakes and means for holding the same at angles to the line of draft in opposite directions from the truck, a transverse rake at the rear of said truck, an elevating-conveyer for raked hay, a delivery-conveyer arranged to receive hay from the elevating-conveyer, and suitable mechanism operative to accomplish horizontal longitudinal adjustment of the delivery-conveyer independent of said elevating-conveyer.

3. A hay rake and loader comprising a truck for connection with a vehicle to be loaded, gathering-rakes and means for holding the same at angles to the line of draft in opposite directions from the truck, a hay-lifting mechanism at the rear of said truck, an elevating-conveyer for lifted hay, a delivery-conveyer arranged to receive hay from the elevating-conveyer, and suitable mechanism operative to accomplish horizontal longitudinal adjustment of the delivery-conveyer independent of said elevating-conveyer.

4. A hay rake and loader comprising a truck for connection with the vehicle to be loaded, gathering-rakes and means for holding the same at angles to the line of draft in opposite directions from the truck, a transverse rake at the rear of the truck, a hay-lifting mechanism in advance of the transverse rake, an elevating-conveyer for lifted hay, a delivery-conveyer arranged to receive hay from the elevating-conveyer, and suitable mechanism operative to accomplish horizontal longitudinal adjustment of the delivery-conveyer independent of said elevating-conveyer.

5. A hay rake and loader comprising a truck for connection with a vehicle to be loaded, gathering-rakes and means for holding the same at angles to the line of draft in opposite directions from the truck, radially-reciprocative hay-lifters at the rear of said truck, an elevating-conveyer for lifted hay, a delivery-conveyer arranged to receive hay from the elevating-conveyer, and suitable mechanism operative to accomplish horizontal longitudinal adjustment of the delivery-conveyer independent of said elevating-conveyer.

6. A hay rake and loader comprising a truck for connection with a vehicle to be loaded, gathering-rakes and means for holding the same at angles to the line of draft in opposite directions from the truck, a transverse rake at the rear of said truck, radially-reciprocative rotative hay-lifters in advance of the transverse rake, an elevating-conveyer for lifted hay, a delivery-conveyer arranged to receive hay from the elevating-conveyer, and suitable mechanism operative to accomplish horizontal longitudinal adjustment of the delivery-conveyer independent of said elevating-conveyer.

7. A suitable truck, bars in connection therewith at the front of the same, supporting-wheels for the bars, suitable means for maintaining said bars at an angle to the truck, other bars hung by cranks from those aforesaid, rake-teeth having pivotal connection with the latter bars, and eveners in similar connection with said teeth.

8. A suitable truck, bars in connection therewith at the front of the same, supporting-wheels for the bars, suitable means for maintaining said bars at an angle to the truck, cranks having their bearings on the aforesaid bars, other bars hung on the cranks, rake-teeth having pivotal connection with the latter bars, eveners in similar connection with said teeth, and springs interposed between the upper and lower bars.

9. A suitable truck, bars in connection therewith at the front of the same, supporting-wheels for the bars, suitable means for maintaining said bars at an angle to the truck, posts on said truck provided with guide-brackets, bar-braces having vertical play in connection with said brackets, fixed supports, a cable run under the supports and connected at its ends to the guide-engaging extremities of said braces, cranks having their bearings on said bars, other bars hung on the cranks, rake-teeth in pivotal connection with the latter bars, and eveners in similar connection with said teeth.

10. A suitable truck, bars in hinge connection therewith at the front of the same, wheels in swivel connection with the bars, adjustable reaches for maintaining said bars at various angles to said truck, cranks having their bearings on the aforesaid bars, other bars hung on the cranks, rake-teeth having pivotal connection with the latter bars, and eveners in similar connection with said teeth.

11. A suitable truck, bars in connection therewith at the front of the same, supporting-wheels for the bars, suitable means for maintaining said bars at an angle to the truck, other bars hung from those aforesaid, rake-teeth having pivotal connection with the latter bars, eveners in similar connection with said bars, and suitable means for automatic clearing of material from the rakes.

12. A suitable truck, gathering-rakes in connection therewith at the front of the same, a superstructure on the truck, a frame loose on the superstructure, link belts that being joined to the rear of the frame are trained on sprocket-wheels carried by shafts supported on said truck and superstructure, a spindle joined to the link belts, a chain conveyer that engages sprocket-wheels on the spindle and those on a shaft carried at the forward end of said frame, another chain conveyer arranged to elevate and deliver raked hay to the one aforesaid, suitable means for adjusting the position of the aforesaid frame in a longitudinal direction, and other suitable means for transmitting motion from the truck-axle to said conveyers.

13. A suitable truck, gathering-rakes in connection therewith at the front of the same, a superstructure on the truck, a horizontal longitudinally-movable frame loose on the superstructure, an adjusting mechanism for the frame, suitable means for throwing the adjusting mechanism in and out of train with the truck-axle, a conveyer adjustable with the forward portion of the frame, another conveyer arranged to elevate and deliver raked hay to the one aforesaid, and suitable means for transmitting motion from said truck-axle to the conveyers.

14. A suitable truck, gathering-rakes in connection therewith at the front of the same, a superstructure on the truck, a frame loose on the superstructure, a squared rod journaled on the frame, a lever-arm that being loosely fitted on said rod is held against play longitudinally of the same, a bell-crank that has one arm thereof in link connection with the lever-arm and its other arm terminated in a yoke, a right-angled arm loose on a rotative shaft and having a hub provided with an annular groove loosely engaged by said yoke, a ratchet-wheel fast on the shaft, another arm loose on the shaft and provided with a slot engaged by the horizontal portion of the right-angled arm, a pallet hung on the slotted arm for coöperation with the ratchet-wheel and provided with a shank engaging a diagonal slot in said horizontal portion of said right-angled arm, a truck-axle crank, a pitman connecting the crank and pallet-arm, a conveyer adjustable with the aforesaid frame, another conveyer arranged to elevate and deliver raked hay to the one aforesaid, and suitable means for transmitting motion from the truck-axle to said conveyers.

15. A suitable truck, gathering-rakes in connection therewith at the front of the same, a superstructure on the truck, a frame loose on the superstructure, a wind-shield carried by the frame, suitable means for adjusting the position of said frame in a longitudinal direction, a conveyer adjustable with the forward portion of the aforesaid frame, another conveyer arranged to elevate and deliver raked hay to the one aforesaid, and suitable means for transmitting motion from the truck-axle to said conveyers.

16. A truck, gathering-rakes and means for holding the same at angles to the line of draft in opposite directions from the truck, a superstructure on said truck embodying wind-boards, an endless hay-elevating conveyer having its lifting stretch intermediate of the wind-boards, a delivery-conveyer arranged to receive hay from the elevating-conveyer, and suitable mechanism operative to accomplish horizontal longitudinal adjustment of the delivery-conveyer independent of said elevating-conveyer.

17. A truck, gathering-rakes and means for holding the same at angles to the line of draft in opposite directions from the truck, a superstructure on the truck embodying inclined wind-boards, a bar in hinge connection with the wind-boards, spring and lever controlled rake-teeth connected to the bar, an endless hay-elevating conveyer having its lifting stretch intermediate of said wind-boards, a delivery-conveyer arranged to receive hay from the elevating-conveyer, and suitable mechanism operative to accomplish horizontal longitudinal adjustment of the delivery-conveyer independent of said elevating-conveyer.

In testimony that I claim the foregoing I have hereunto set my hand, at Union Grove, in the county of Racine and State of Wisconsin, in the presence of two witnesses.

THEODORE RASMUSSEN.

Witnesses:
 JAMES HURD,
 CLARENCE HURD.